US012420581B2

(12) United States Patent
Heisler, III et al.

(10) Patent No.: US 12,420,581 B2
(45) Date of Patent: Sep. 23, 2025

(54) RECEPTACLE FOR PAINT ROLLER

(71) Applicants: Joseph F. Heisler, III, Toms River, NJ (US); Michael Heisler, Toms River, NJ (US); Christopher Lanagan, Wall Township, NJ (US)

(72) Inventors: Joseph F. Heisler, III, Toms River, NJ (US); Michael Heisler, Toms River, NJ (US); Christopher Lanagan, Wall Township, NJ (US)

( * ) Notice: Subject to any disclaimer, the term of this patent is extended or adjusted under 35 U.S.C. 154(b) by 17 days.

(21) Appl. No.: 18/435,292

(22) Filed: Feb. 7, 2024

(65) Prior Publication Data

US 2025/0249703 A1 Aug. 7, 2025

(51) Int. Cl.

| | |
|---|---|
| ***B44D 3/12*** | (2006.01) |
| ***B05C 17/00*** | (2006.01) |
| ***B05C 17/02*** | (2006.01) |
| ***B05C 21/00*** | (2006.01) |

(52) U.S. Cl.
CPC .......... *B44D 3/126* (2013.01); *B05C 17/0245* (2013.01); *B44D 3/123* (2013.01)

(58) Field of Classification Search
CPC ..... A46B 17/02; A46B 17/00; B05C 17/0245; B05C 21/00; B05C 17/00; B44D 3/123; B44D 3/126; B44D 3/00; B44D 3/125; B44D 3/128
USPC .......... 211/65; 220/570, 697, 751, 752, 736; 248/113, 211; 15/257.06, 230.11; 206/361, 229, 1.7, 15.3, 1.8
See application file for complete search history.

(56) References Cited

U.S. PATENT DOCUMENTS

| | | | | | |
|---|---|---|---|---|---|
| 2,487,516 | A * | 11/1949 | Braswell | B44D 3/123 | 248/110 |
| 2,676,730 | A * | 4/1954 | Hedglon | B44D 3/128 | 248/110 |
| 2,932,838 | A * | 4/1960 | Oucllette | B44D 3/125 | 248/110 |
| 2,950,012 | A * | 8/1960 | Mascaretti | B44D 3/123 | 211/65 |
| 3,087,190 | A * | 4/1963 | Werner | B44D 3/006 | 401/121 |
| 3,351,970 | A * | 11/1967 | Engh | B44D 3/126 | D32/53.1 |
| 3,837,034 | A * | 9/1974 | Leffert | B44D 3/123 | 220/570 |
| 4,025,205 | A * | 5/1977 | Hawk | B44D 3/126 | 401/121 |
| 4,167,348 | A * | 9/1979 | Hawk | B44D 3/126 | 401/121 |

(Continued)

FOREIGN PATENT DOCUMENTS

BR 202020018087 U2 3/2022

*Primary Examiner* — Gideon R Weinerth
(74) *Attorney, Agent, or Firm* — MOSER TABOA

(57) ABSTRACT

A receptacle for a paint roller includes: a tray having a base, an open top, two opposed side walls, a front wall, and a rear wall defining a cavity configured to receive the paint roller, wherein at least one groove is formed in at least one of the two opposed side walls, the groove configured to receive a portion of a handle of the paint roller; and a coupler extending from the front wall, the coupler having a channel configured to removably couple to a rim of a paint container, the channel having a length that is less than half of a length of the front wall.

19 Claims, 3 Drawing Sheets

(56) References Cited

U.S. PATENT DOCUMENTS 4,561,556 A * 12/1985 Bendix .................. B44D 3/123 220/699
4,569,449 A 2/1986 Brent
4,890,353 A * 1/1990 Shannon ................ B44D 3/123 248/909
4,993,767 A * 2/1991 Song ....................... A47J 45/10 220/759
5,123,576 A * 6/1992 Lawrence .............. B44D 3/126 222/570
5,472,111 A 12/1995 Renfrew
5,687,873 A * 11/1997 Jones ..................... A46B 17/02 220/736
5,713,095 A * 2/1998 Wakat ................. B05C 17/0232 492/19
5,746,345 A * 5/1998 Zurawin ................ B44D 3/126 220/736
5,816,549 A * 10/1998 Anderson .............. B44D 3/126 248/210
6,237,802 B1 5/2001 Douglas
6,443,260 B1 * 9/2002 Katz ......................... E06C 7/14 248/238
6,446,829 B1 9/2002 Malvasio et al.
6,493,901 B1 * 12/2002 Jones ....................... B44D 3/12 220/570
6,802,715 B1 * 10/2004 Wotton .................... B44D 3/04 434/84
7,527,164 B1 * 5/2009 Reichborn ............... B44D 3/14 220/570
7,648,022 B1 * 1/2010 Freeauf .................. B44D 3/126 220/570
9,493,282 B2 * 11/2016 Nielsen .................. B65D 25/22
10,399,378 B1 * 9/2019 Mitchell ................ B44D 3/123
2002/0100848 A1 * 8/2002 Ahl ......................... E06C 7/146 248/211
2005/0145764 A1 * 7/2005 Cudney ..................... E06C 7/14 248/230.1
2005/0252920 A1 * 11/2005 Cumming .............. B44D 3/126 206/229
2006/0201951 A1 * 9/2006 Cingel ................... B44D 3/125 220/570
2007/0018066 A1 1/2007 Thiel
2008/0040881 A1 * 2/2008 Maria cornelissen . B44D 3/126 15/257.06
2009/0211934 A1 * 8/2009 McKenzie ............. B44D 3/123 206/349
2009/0285997 A1 * 11/2009 Bartok ................... B44D 3/123 220/736
2009/0314788 A1 12/2009 Douglas
2012/0152961 A1 * 6/2012 DiBlasi .................. B44D 3/006 220/570
2013/0186902 A1 * 7/2013 Bar-Shlomo ........... B44D 3/126 220/570
2014/0068922 A1 * 3/2014 Roffe ..................... B44D 3/123 29/525.08
2018/0345716 A1 * 12/2018 McGrory ............... B44D 3/125
2021/0237504 A1 * 8/2021 Turner ................... A46B 17/02
2022/0297471 A1 9/2022 Aviguetero
2023/0241911 A1 8/2023 Torres
2023/0249491 A1 * 8/2023 Welper ..................... B44D 3/14 211/65
2024/0253390 A1 * 8/2024 Torres .................... B44D 3/123
2025/0214367 A1 * 7/2025 Torres ...................... B44D 3/14

* cited by examiner

RECEPTACLE FOR PAINT ROLLER

FIELD

Embodiments of the present disclosure generally relate to a receptacle for a paint roller, and more specifically, to a receptacle configured for coupling to a paint container.

BACKGROUND

Paint rollers may include a handle, a frame having a first end connected to the handle, and a roller cover connected to a second end of the frame. Some paint rollers may have a frame that includes a roller cage pivotally connected to the second end of the frame where the roller cover fits over the roller cage. Some paint rollers are mini rollers in which the roller cover and the cage are essentially integrated together and connect to the second end of the frame. In either case, the roller cover is used to spread paint or other liquid coatings, on a surface as the roller cover rotates.

Often, painters use a combination of paint brushes and rollers to paint various surfaces, such as walls and ceilings. While painting, a painter may switch between using a brush and a roller depending on the area being painted. Painters may transfer paint from a larger container to a handheld paint container, which can be handled in one hand while handling a brush in another hand. Also, painters may transfer paint to a shallow roller paint tray located on a floor for use with paint rollers. Often, when a painter is not using a roller, the painter may rest the roller in the paint tray sitting on the ground or floor, which can create a tripping hazard for the painter. Also, if a painter wishes to switch between the roller and the brush, the painter must crouch down and pick up the roller from the paint tray on the ground or floor.

Thus, the inventors propose a novel way to manage a paint roller.

SUMMARY

Methods and apparatus for a paint roller are provided herein. In some embodiments, a receptacle for a paint roller includes a tray having a base, an open top, two opposed side walls, a front wall, and a rear wall defining a cavity configured to receive the paint roller, wherein at least one groove is formed in at least one of the two opposed side walls, the groove configured to receive a portion of a handle of the paint roller; a coupler extending from the front wall, the coupler having a channel configured to removably couple to a rim of a paint container, the channel having a length that is less than half of a length of the front wall; a set of stabilizers extending from opposite sides of the coupler, the set of stabilizers configured to contact the rim of the paint container and stabilize the receptacle when the receptacle is coupled to the paint container; and an abutment extending from the front wall below the coupler, the abutment configured to contact a side of the paint container when the receptacle is coupled to the paint container.

In some embodiments, a receptacle for a paint roller includes a tray having a cavity configured to receive the paint roller; a coupler extending from the tray, the coupler having a channel configured to removably couple to a rim of a paint container; a set of stabilizers extending from opposite sides of the coupler, the set of stabilizers configured to contact the rim of the paint container and stabilize the receptacle when the receptacle is coupled to the paint container; and an abutment extending from the tray below the coupler, the abutment configured to contact a side of the paint container when the receptacle is coupled to the paint container.

In some embodiments, a receptacle for a paint roller comprises a tray having a base, an open top, two opposed side walls, a front wall, and a rear wall defining a cavity configured to receive the paint roller, wherein at least one groove is formed in at least one of the two opposed side walls, the groove configured to receive a portion of a handle of the paint roller; and a coupler extending from the front wall, the coupler having a channel configured to removably couple to a rim of a paint container, the channel having a length that is less than half of a length of the front wall.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
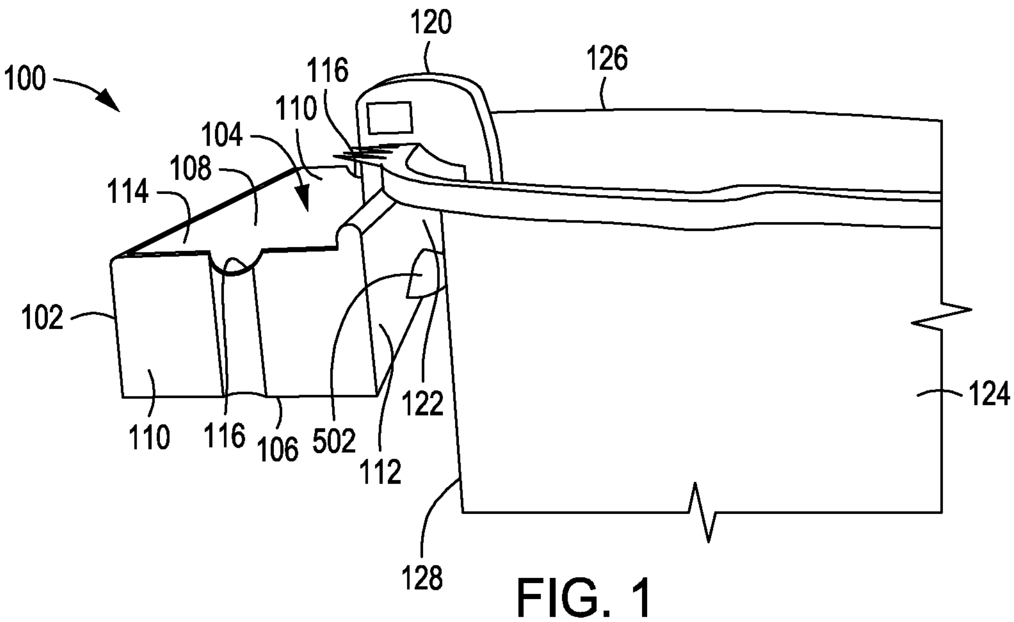
FIG. 1 shows a paint container coupled to a receptacle for a paint roller according to some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Figure 6:
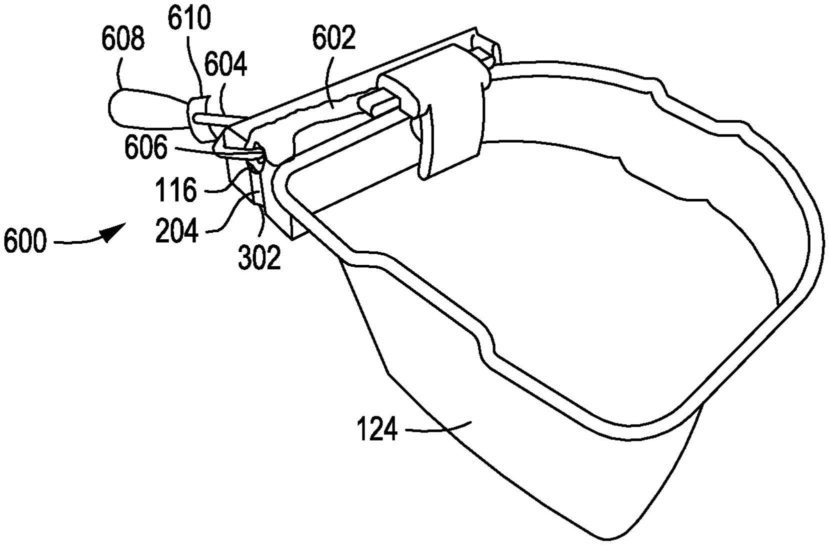
FIG. 6 shows the paint container and coupled receptacle of FIG. 1 on a flat surface and with a roller cover and a second end of a paint roller frame in a cavity of the receptacle.
Figure 7:
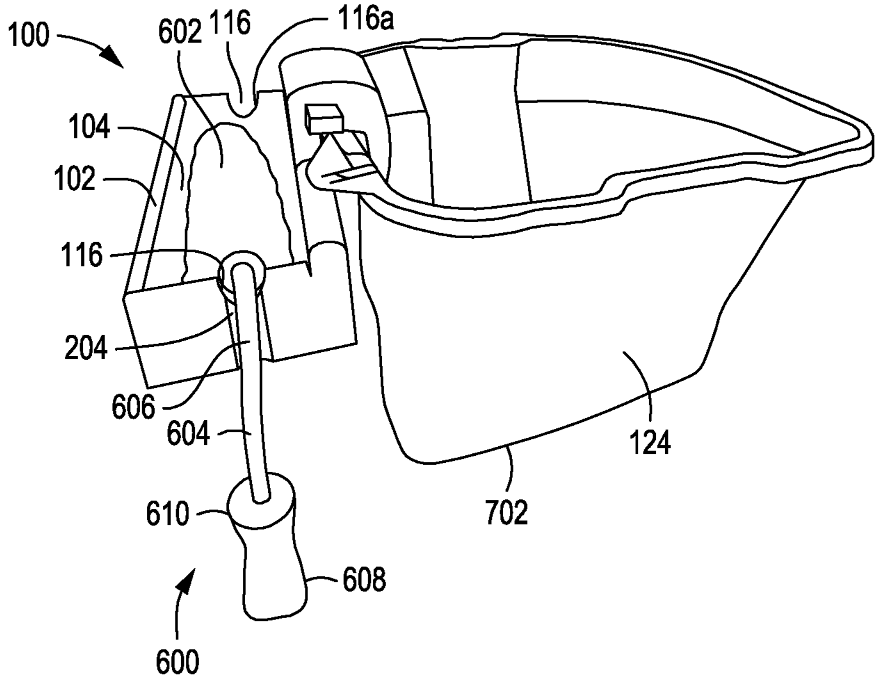
FIG. 7 shows the paint container, receptacle, and paint roller of FIG. 6 held above the flat surface.

Embodiments of a receptacle for a paint roller are provided herein. In some embodiments, and as shown in FIGS. 1, 6, and 7, a receptacle 100 may be configured to be coupled to a paint container 124, such as a mini handheld paint container typically carried (e.g., by hand) by a painter while painting. Also, in some embodiments, and as shown in FIGS. 6 and 7, the receptacle 100 may be configured to removably couple to at least a portion of a paint roller 600, such as a mini paint roller that may have a roller cover 602 having a length less than standard paint rollers. In some embodiments, the roller cover 602 may have a length up to 7 inches. Thus, while a user is holding the paint container 124 coupled to the receptacle 100, the paint roller 600 may be at least partially retained in the receptacle 100 so that the paint roller 600 remains within reach of the user and not in a paint tray lying on the floor, which may be both inconvenient and a potential tripping hazard. Moreover, when a user wishes to switch from using the paint roller 600 to a brush, the user need only place the paint roller 600 at least partially in the receptacle 100 and resume painting with the brush (e.g., in the paint container or receptacle. Additionally, when a user wishes to stop painting, the user may place the paint container 124 and the coupled receptacle 100 on a flat surface while the paint roller 600 remains at least partially retained in the receptacle 100.

FIG. 1 shows the receptacle 100 for a paint roller 600 (FIG. 6) in accordance with some embodiments of the present disclosure. In some embodiments, the receptacle 100 may include a tray 102 having a cavity 104 configured to receive at least a portion of the paint roller 600. For example, the paint roller 600 may include a handle 608, a frame 604 having a first end 610 connected to the handle, and a roller cover 602 pivotally connected to a second end 606 of the frame 604.

In some embodiments, and as shown in FIGS. 6 and 7, the cavity 104 may be configured to receive at least one of the roller cover 602 or a second end 606 of the frame 604 of the paint roller 600. In some embodiments, and as shown in FIG. 1, the tray 102 may have a base 106, an open top 108, two opposed side walls 110 (e.g., left and right side walls), a front wall 112, and a rear wall 114 defining the cavity 104. While straight walls are shown, in some embodiments, some or all of the walls of the tray 102 may be curved and may form a semi or continuous shape (e.g. an oblong cavity).

In some embodiments, the receptacle 100 may be formed from various materials, including rigid or flexible plastic. In some embodiments, the receptacle 100 may be formed as a single piece or as an assembly (e.g., snap fit). In some embodiments, the cavity may be configured to accept a disposable liner (not shown) to facilitate cleanup.

In some embodiments, and as shown in FIG. 1, at least one groove 116 may be formed in at least one of the two opposed side walls 110. In some embodiments, and as shown in FIG. 1, receptacle 100 may have at least one groove 116 in each of the two opposed side walls 110. The grooves 116 in each side wall 110 may be opposed to one another or offset (i.e., in a front to back offset). In some embodiments, and as shown in FIGS. 6 and 7, one or more groove 116 may be configured to receive a portion of the frame 604 of the paint roller 600. In some embodiments, and as shown in FIG. 7, the groove 116 may include at least a curved or semicircular end **116*a* which may be complementary to the profile of the portion of the frame 604 received in the groove 116. This may allow the frame 604 and handle 608 to swing or otherwise rotate freely when the frame 604 is received in the groove 116**.

Figure 2:
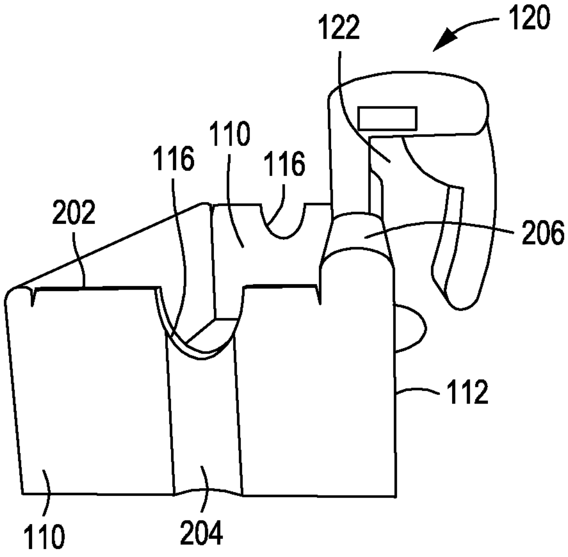
FIG. 2 shows a right side of the receptacle shown in FIG. 1.
Figure 3:
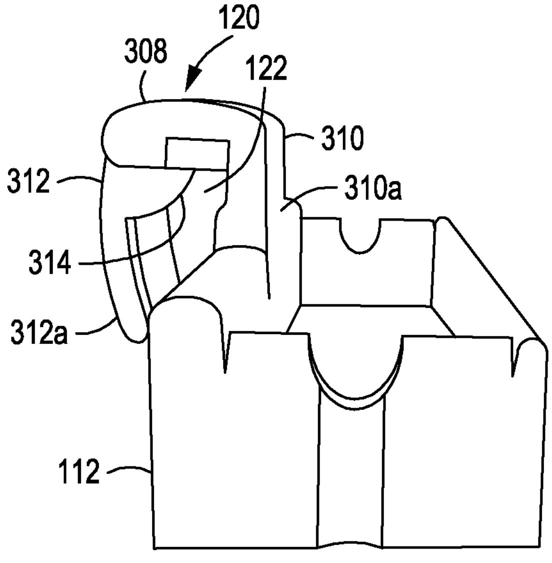
FIG. 3 shows a left side of the receptacle shown in FIG. 1.

In some embodiments, and as shown in FIG. 2, one or more grooves 116 may be formed in a top edge 202 of one or both side walls 110. In some embodiments, and as shown in FIGS. 2 and 3, at least one groove 204 may be formed vertically along one or both side walls 110. In some embodiments, the grooves 116 and 204 may intersect as shown in FIGS. 2 and 3. The grooves 204 may be configured to receive a portion of the frame 604, as shown in FIG. 7, and may assist in inhibiting the swinging motion of the handle 608 as described in greater detail below.

In some embodiments, and as shown in FIGS. 1, the receptacle 100 may include a coupler 120 having a channel 122 configured to removably couple to a rim 126 of the paint container 124. The channel 122 may have a profile configured to receive and retain the rim 126 of the paint container 124 so as to removably couple the receptacle 100 to the paint container 124. In some embodiments, the channel 122 may have a generally u-shaped or s-shaped profile. These shapes are merely exemplary and not intended to be limiting. In some embodiments, and as shown in FIGS. 2-3, the coupler 120 may extend (e.g., vertically and/or horizontally) from the front wall 112. In some embodiments, and as shown in FIG. 2, the coupler 120 may extend from a top edge 206 of the front wall 112.

In some embodiments, and as shown in FIG. 3, the coupler 120 may have a base 308, a first leg 310 extending from the base 308, and a second leg 312 extending from the base 308. The first leg 310 may have a first end **310*a* fixed to the front wall 112 and the second leg 312 may have a free first end 312*a*. The second leg 312 may be angled or curved towards the front wall 112. The coupler 120 may have a curved (e.g., convex) surface 314 extending between the base 308 and the second leg 312. Thus, in at least the embodiment shown in FIG. 3, the channel 122** may have a generally s-shaped profile.

Figure 4:
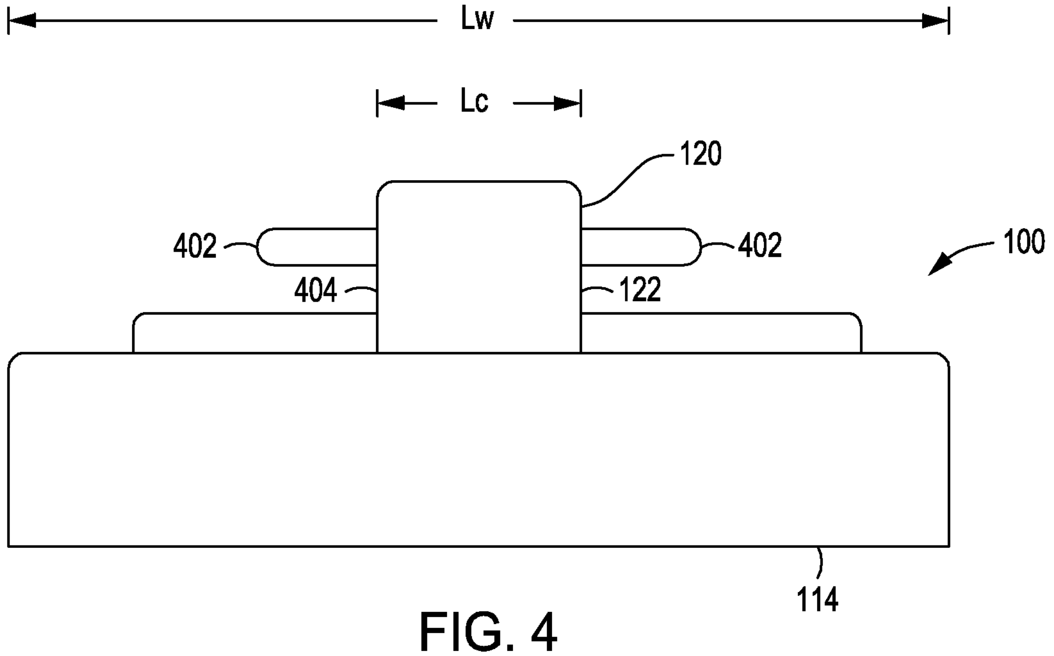
FIG. 4 shows a front side of the receptacle shown in FIG. 1.
Figure 5:
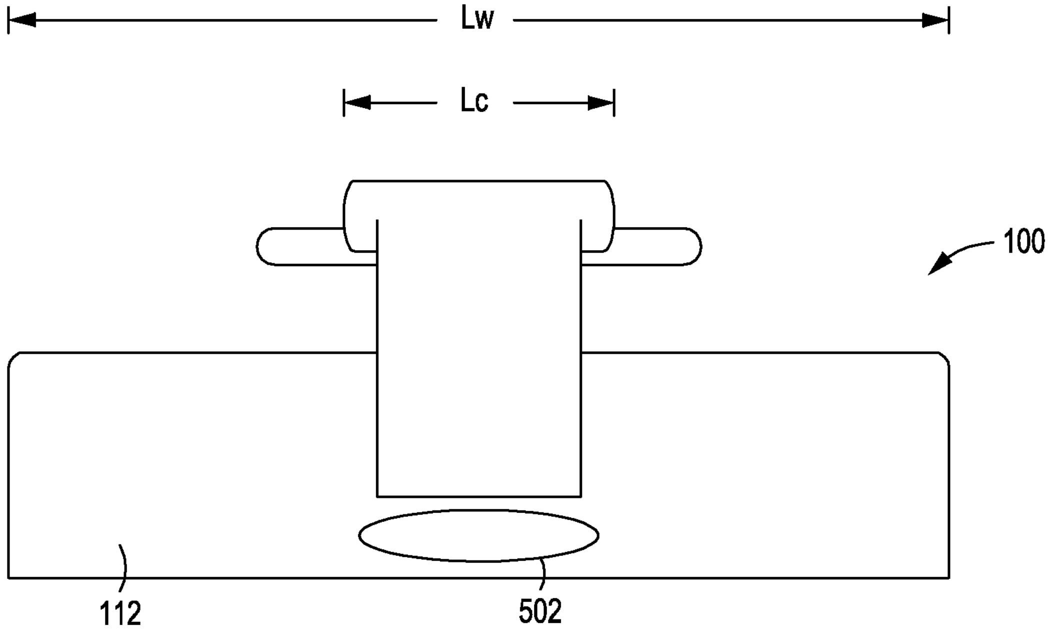
FIG. 5 shows a rear side of the receptacle shown in FIG. 1.

In some embodiments, and as shown in FIGS. 4-5, the channel 122 may have a length Lc that is less than half of a total length Lw of the front wall 112. In some embodiments, the channel 122 may have a length Lc that is less than or equal to one third of the total length Lw of the front wall 112. These relative dimensions between Lc and Lw may allow the coupler 120 to couple to a curved rim 126 of the paint container 124.

In some embodiments, the coupler 120 is located at a midpoint along the length Lw of the front wall 112. In some embodiments, and as shown in FIG. 4, the receptacle 100 may include a set of stabilizers 402 extending from opposite sides 404 of the coupler 120. In some embodiments, the stabilizers 402 may be configured to contact the rim 126 of the paint container 124 to stabilize and limit rotation of the receptacle 100 with respect to the paint container 124 when the receptacle 100 is coupled to the paint container 124.

In some embodiments, and as shown in FIG. 5, the receptacle may include an abutment 502 extending from the front wall 112 below the coupler 120. In some embodiments, the abutment 502 is located at a midpoint along the length Lw of the front wall 112. In some embodiments, and as shown in FIG. 1, when the receptacle 100 is coupled to the paint container 124, the abutment 502 may contact the side wall 128 of the paint container 124 to further stabilize the receptacle 100.

During use, a user may couple the receptacle 100 to the paint container 124 by inserting the rim 126 of the paint container 124 into the channel 122 of the coupler 120 and wedging the rim 126 between at least one of the first leg 310, the second leg 312, or the curved surface 314, as is shown for example, in FIG. 1. The receptacle 100 may be pushed downward on the rim 126 so that the rim 126 may be located as deep as possible into the channel 122 towards the base 308 to minimize the distance between the stabilizers 402 and the rim 126.

A user may place at least one of the roller cover 602 or the second end 606 of the frame 604 into the cavity 104 of the coupled receptacle 100. If one or more grooves 116 are present, at least a portion of the frame 604 may be received in the one or more grooves 116. If one or more grooves 204 are present, when the user raises the paint container 124 and the coupled receptacle 100 above the floor, as shown in FIG. 7, the handle 608 may swing downward so that the at least a portion (e.g., second end 606) of the frame 604 can seat itself in the groove 204 to inhibit further swinging of the handle 608 relative to the receptacle 100 during movement of the paint container 124.

When raised, the handle 608 may extend below a bottom 702 of the paint container 124, as shown in FIG. 7. In some embodiments, if the user places the paint container 124 and the coupled receptacle 100 on a flat surface (e.g., a floor), as shown for example in FIG. 6, the handle 608 may contact the flat surface to unseat the portion of the frame (e.g., second end 606) from the groove 204 thereby allowing the handle 608 to swing rearwardly while the roller cover 602 and the second end 606 of the frame 604 remain in the cavity 104. In this manner, the paint roller 600 may remain at least partially retained in the receptacle 100 whether the user is holding the paint container 124 and the receptacle over the flat surface or sets it down.

While the foregoing is directed to embodiments of the present disclosure, other and further embodiments of the disclosure may be devised without departing from the basic scope thereof.

The invention claimed is:

1. A receptacle for a paint roller having a roller cover, a frame, and a handle, the receptacle comprising:

a tray having a base, an open top, two opposed sidewalls, a front wall, and a rear wall defining a cavity configured to receive the paint roller, wherein said tray comprises a cut-out at an upper rim of the tray and a vertically oriented groove below said cut-out formed along an exterior of one of the sidewalls of the tray, wherein said cut-out is configured to accommodate a first portion of a paint roller frame and the groove is configured to seat a second portion of the paint roller frame, such that when the roller cover is accommodated within the tray, the paint roller handle is oriented vertically downward outside of the receptacle;

a coupler extending from the front wall, the coupler having a channel configured to removably couple to a rim of a paint container, the channel having a length that is less than half of a length of the front wall; and an abutment extending from the front wall below the coupler, the abutment configured to contact a side of the paint container when the receptacle is coupled to the paint container.

2. The receptacle of claim 1, wherein each opposed sidewall of the tray includes a cut-out.

3. The receptacle of claim 1, wherein the channel is generally u shaped.

4. The receptacle of claim 1, wherein the channel has a length that is less than or equal to one third of the length of the front wall.

5. The receptacle of claim 1, wherein the coupler extends from a top edge of the front wall.

6. The receptacle of claim 1, comprising a set of stabilizers extending from opposite sides of the coupler, the set of stabilizers configured to contact the rim of the paint container and stabilize the receptacle when the receptacle is coupled to the paint container.

7. A receptacle for a paint roller having a roller cover, a frame, and a handle, the receptacle comprising:

a tray having a cavity configured to receive the paint roller, wherein said tray comprises a cut-out at an upper rim of the tray and a vertically oriented groove below said cut-out formed along an exterior sidewall of the tray, wherein said cut-out is configured to accommodate a first portion of a paint roller frame and the groove is configured to seat a second portion of the paint roller frame, such that when the roller cover is accommodated within the tray, the paint roller handle is oriented vertically downward outside of the receptacle;

a coupler extending from the tray, the coupler having a channel configured to removably couple to a rim of a paint container; and an abutment extending from the tray below the coupler, the abutment configured to contact a side of the paint container when the receptacle is coupled to the paint container.

8. The receptacle of claim 7, wherein the tray has a base, an open top, two opposed sidewalls, a front wall, and a rear wall defining the cavity.

9. The receptacle of claim 8, wherein each opposed sidewall of the tray includes a cut-out.

10. The receptacle of claim 7, wherein the channel is generally u shaped.

11. The receptacle of claim 7, wherein the channel has a length that is less than half of a length of a front wall of the tray.

12. The receptacle of claim 11, wherein the channel has a length that is less than one third of a length of the front wall.

13. The receptacle of claim 11, wherein the coupler extends from a top edge of the front wall.

14. The receptacle of claim 7, comprising a set of stabilizers extending from opposite sides of the coupler, the set of stabilizers configured to contact the rim of the paint container and stabilize the receptacle when the receptacle is coupled to the paint container.

15. A receptacle for a paint roller having a roller cover, a frame, and a handle, the receptacle comprising:

a tray having a base, an open top, two opposed sidewalls, a front wall, and a rear wall defining a cavity configured to receive the paint roller, wherein said tray comprises a cut-out at an upper rim of the tray and a vertically oriented groove below said cut-out formed along an exterior of one of the sidewalls of the tray, wherein said cut-out is configured to accommodate a first portion of a paint roller frame and the groove is configured to seat a second portion of the paint roller frame, such that when the roller cover is accommodated within the tray, the paint roller handle is oriented vertically downward outside of the receptacle; and a coupler extending from the front wall, the coupler having a channel configured to removably couple to a rim of a paint container, the channel having a length that is less than half of a length of the front wall.

16. The receptacle of claim 15, further comprising a set of stabilizers extending from opposite sides of the coupler, the set of stabilizers configured to contact the rim of the paint container and stabilize the receptacle when the receptacle is coupled to the paint container.

17. The receptacle of claim 15, further comprising an abutment extending from the front wall the abutment configured to contact a side of the paint container when the receptacle is coupled to the paint container.

18. The receptacle of claim 15, wherein the channel has a length that is less than one third of the length of the front wall.

19. The receptacle of claim 15, wherein the coupler extends from a top edge of the front wall.

* * * * *